(12) United States Patent
Hiroto et al.

(10) Patent No.: US 9,393,513 B2
(45) Date of Patent: Jul. 19, 2016

(54) AIR FILTER UNIT

(71) Applicant: NIPPON MUKI CO., LTD, Yuki-shi, Ibaraki (JP)

(72) Inventors: Michihiro Hiroto, Yuki (JP); Shiro Hayashi, Yuki (JP); Kazuhiro Sugimoto, Yuki (JP)

(73) Assignee: NIPPON MUKI CO., LTD., Ibaraki (JP)

( * ) Notice: Subject to any disclaimer, the term of this patent is extended or adjusted under 35 U.S.C. 154(b) by 10 days.

(21) Appl. No.: 14/411,391

(22) PCT Filed: Jun. 25, 2013

(86) PCT No.: PCT/JP2013/067400
§ 371 (c)(1),
(2) Date: Oct. 16, 2015

(87) PCT Pub. No.: WO2014/003011
PCT Pub. Date: Jan. 3, 2014

(65) Prior Publication Data
US 2016/0030876 A1 Feb. 4, 2016

(30) Foreign Application Priority Data

Jun. 25, 2012 (JP) .................................. 2012-142103

(51) Int. Cl.
*B01D 46/52* (2006.01)
*B01D 46/10* (2006.01)
(Continued)

(52) U.S. Cl.
CPC .......... *B01D 46/523* (2013.01); *B01D 46/0002* (2013.01); *B01D 46/10* (2013.01); *B01D 46/4218* (2013.01); *B01D 29/07* (2013.01)

(58) Field of Classification Search
CPC ............... B01D 46/0002; B01D 46/10; B01D 46/4218; B01D 46/521; B01D 46/523; B01D 29/07
See application file for complete search history.

(56) References Cited

U.S. PATENT DOCUMENTS

| 2,952,333 | A | * | 9/1960 | Bush | ....................... | B01D 46/10 55/500 |
| 3,242,656 | A | * | 3/1966 | Murphy, Jr. | ............ | B01D 46/10 210/485 |

(Continued)

FOREIGN PATENT DOCUMENTS

| JP | 63-6023 U | 1/1988 |
| JP | 4472398 B2 | 3/2010 |

OTHER PUBLICATIONS

European Search Report of corresponding EP Application No. 13 80 8435.5 dated Mach 3, 2016.

*Primary Examiner* — Robert Clemente
(74) *Attorney, Agent, or Firm* — Global IP Counselors

(57) ABSTRACT

An air filter unit has a pleated filter medium with a zigzag shape in which a fibrous filter medium has been folded multiple times. The coefficients of linear expansion of the space-supporting members provided in each of the multiple folded spaces of the pleated filter medium are equal to or greater than the coefficient of linear expansion of the metal filter frame of the filter unit. The linear expansion coefficients of first space-supporting members are smaller than the linear expansion coefficient of a second space-supporting member. The first space-supporting members are provided in side portion regions including both side portions positioned at outermost sides of the pleated filter medium in a second direction perpendicular to the first direction. The second space-supporting member is provided in a central portion region sandwiched between the side portion regions.

11 Claims, 6 Drawing Sheets

(51) Int. Cl.
   *B01D 46/42*   (2006.01)
   *B01D 46/00*   (2006.01)
   *B01D 29/07*   (2006.01)

(56) References Cited

U.S. PATENT DOCUMENTS

| | | | | |
|---|---|---|---|---|
| 3,293,833 A * | 12/1966 | Barany | ............... | B01D 29/0093 210/485 |
| 3,423,908 A * | 1/1969 | Hart | ............... | B01D 46/0004 55/481 |
| 3,757,499 A * | 9/1973 | Scott | ............... | B01D 46/10 55/500 |
| 3,807,150 A * | 4/1974 | Maracle | ............... | B01D 46/523 210/493.1 |
| 3,941,571 A * | 3/1976 | Getzin | ............... | B01D 46/10 428/136 |
| 4,199,387 A * | 4/1980 | Hladik | ............... | B01D 46/12 156/160 |
| 4,203,738 A * | 5/1980 | Kerman | ............... | B01D 46/0065 55/287 |
| 4,227,953 A * | 10/1980 | Wasielewski | ............... | B01D 46/12 156/227 |
| 4,537,812 A * | 8/1985 | Elbers | ............... | B01D 46/0001 428/182 |
| 4,619,676 A * | 10/1986 | Turck | ............... | B01D 46/523 210/493.1 |
| 4,685,944 A * | 8/1987 | Allan | ............... | B01D 46/0004 55/491 |
| 4,795,481 A * | 1/1989 | Ellis | ............... | B01D 46/521 55/500 |
| 5,395,411 A * | 3/1995 | Kobayashi | ............... | B01D 39/083 55/486 |
| 5,674,303 A * | 10/1997 | Ter Horst | ............... | B01D 46/0001 55/497 |
| 2012/0180664 A1 * | 7/2012 | Lundquist | ............... | B01D 46/523 95/273 |

\* cited by examiner

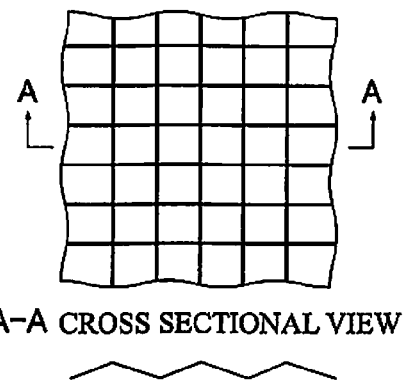
FIG.4A    A-A CROSS SECTIONAL VIEW
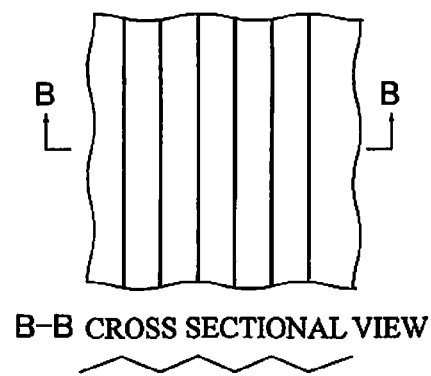
FIG.4B    B-B CROSS SECTIONAL VIEW
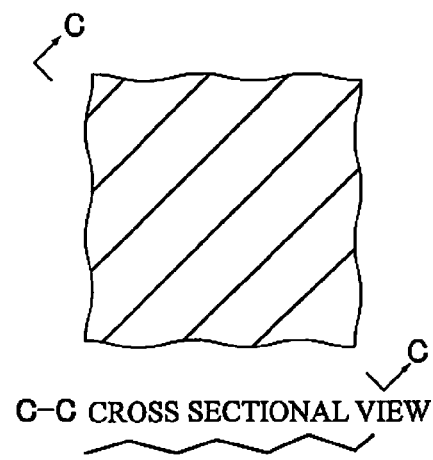
FIG.4C    C-C CROSS SECTIONAL VIEW

AIR FILTER UNIT

CROSS-REFERENCE TO RELATED APPLICATIONS

This application is a U.S. National stage application of International Application No. PCT/JP2013/067400, filed on Jun. 25, 2013. This U.S. National stage application claims priority under 35 U.S.C. §119(a) to Japanese Patent Application No. 2012-142103, filed in Japan on Jun. 25, 2012, the entire contents of which are hereby incorporated herein by reference.

BACKGROUND

1. Field of the Invention

The present invention relates to an air filter unit that collects dust in an air flow.

2. Background Information

Air filters for high temperature for purifying introduced air are used in a process of manufacturing a semiconductor, in a process of coating and drying a steel sheet for automobile, and the like. There is need to purify the introduced air in a process that requires a high temperature such as several 100° C., at the time of manufacturing a semiconductor, especially, at the time of forming a film or forming a fine pattern in manufacturing a flat panel display. Therefore, an air filter for high temperature that is excellent in heat resistance is demanded.

Conventionally, when a film medium is housed in a filter frame body, a method of bonding and fixing the filter medium and the filter frame body with ceramic cement has been used (Japanese Utility Model Application Publication No. 63-6023).

Typically, an air filter unit is heated to a temperature of 300 to 400° C., for example, when the air filter unit for high temperature is used, and the air filter unit is cooled to the room temperature when not used. Therefore, the air filter unit is subject to a thermal history in which the room temperature and the high temperature of 300 to 400° C. are repeated. Therefore, a layer of an adhesive used between the filter medium and the filter frame body is damaged and cracked due to the thermal history and a difference of expansion coefficients between the adhesive and the filter medium or between the adhesive and the filter frame body, and sealability of the air filter unit may not be able to be maintained. In this case, small dust and the like pass through the crack, and flow into a downstream. Further, a part of the filter medium may be damaged.

Meanwhile, an air filter that can be used in a high-temperature range, and improves work efficiency for producing an air filter, without using adhesives such as a silicone resin and a heat-resistance inorganic sealing agent, is known (Japanese Patent No. 4472398).

In the air filter, a filter pack, in which wave-shaped separators (space-supporting members) are interposed between spaces formed by folding a filter paper (pleating filter medium) in a zigzag manner, is housed in a filter frame through a sheet sealing material with the density of 20 to 120 kg/m$^3$ made of an ultra-fine glass fiber having an average fiber diameter of 1 μm or less, and arranged at zigzag-shaped end portion sides of the filter paper. That is, the air filter unit secures the sealability of the air filter unit by causing the end portions of the filter paper to abut on the sheet sealing material.

Especially, the air filter is used in the high-temperature range. Therefore, stainless steel is used for the filter frame body to be resistance to the high-temperature use, and separators made of aluminum or an aluminum alloy are used.

SUMMARY

However, when the air filter is repeatedly used for a long period, the air filter is subject to the thermal history, and separators 114 made of aluminum or an aluminum alloy contract in the direction of the arrows, as illustrated in FIG. 7, and the spaces formed by folding the filter medium at both side portions of a filter paper 112 cannot be appropriately maintained. Further, a part of the filter paper 112 that cannot be maintained by the separators 114 due to the contraction of the separators 114 is bent, and the end portions of the filter paper 112 in an up and down direction in the drawing do not abut on the sheet sealing material, and a gap may be caused between the sheet sealing material and the filter paper. In such a case, the dust and the like flow into the downstream side of the air filter, and functions of the air filter are not exhibited. Note that the reference numeral 116 in FIG. 7 is the filter frame body and the reference numeral 112 is the pleated filter medium.

Therefore, to solve the conventional problems, an objective of the present invention is to provide an air filter unit that can maintain characteristics of the air filter for a long period even if the air filter unit is subject to a thermal history of a plurality of cycles.

Solution to Problem

The inventors of the present invention have found that, in a conventional air filter unit, contraction of separators (space-supporting members) provided in side portion regions including both side portions of a filter paper (pleated filter medium) that is in contact with a filter frame body is especially large, and the contraction is a major problem in terms of the sealability of the air filter unit. Further, the inventors of the present invention have found that the contraction of the separators (space-supporting members) is caused due to a difference between a linear expansion coefficient of the separators, and a linear expansion coefficient of the filter frame body. That is, the linear expansion coefficient of the separators (space-supporting members) provided in the side portion regions of the filter paper (pleated filter medium) is made lower than the linear expansion coefficient of the separators (space-supporting members) provided in a central portion region of the filter paper (pleated filter member) so as to get closer to the linear expansion coefficient of the filter frame body, whereby the contraction of the separators (space-supporting members) provided in the side portion regions of the filter paper (pleated filter medium) can be reduced. Accordingly, the inventors have found that the sealability of the air filter unit can be maintained, and have reached the present invention.

According to an aspect of the present invention, there is provided an air filter unit that collects dust in an air flow. The air filter unit includes:

a zigzag-shaped pleated filter medium including a fibrous filter medium folded along a first direction multiple times;

a plurality of metal space-supporting members bent in a wave-shaped manner and extending in the first direction, and inserted into each of spaces formed by folding the fibrous filter medium in order to maintain each of the spaces formed in the pleated filter medium;

a metal filter frame body surrounding a periphery of the pleated filter medium in which the space-supporting members are inserted into the folded spaces, and supporting and fixing the pleated filter medium; and a fiber sealing material sealing a gap between the pleated filter medium and the filter frame body, by abutting on both end portions of the first direction in the pleated filter medium. Linear expansion coefficients of the space-supporting members are equal to or more than a linear expansion coefficient of the filter frame body. The linear expansion coefficients of first space-supporting members provided in side portion regions including both side portions positioned at outermost sides of the pleated filter medium in a second direction perpendicular to the first direction are smaller than the linear expansion coefficient of a second space-supporting member provided in a central portion region sandwiched between the side portion regions, of the space-supporting members.

A metal material identical to a metal material of the second space-supporting member, and to which thermal treatment is applied at a temperature of 350 to 400° C. for 0.5 to 2 hours is preferably used as the first space-supporting members.

Stainless steel is used as the filter frame body, for example, and aluminum or an aluminum alloy is used as the first space-supporting members and the second space-supporting member, for example.

A ratio A/B is preferably not less than 0.4 and less than 1.0, where the linear expansion coefficient of the first space-supporting members is A, and the linear expansion coefficient of the second space-supporting member is B.

A plurality of embossed uneven portions is preferably provided on a surface of the first space-supporting members.

Advantageous Effects of Invention

According to the above-described air filter unit, characteristics of the air filter can be stably maintained for a long period even if the air filter unit is repeatedly subject to a thermal history.

BRIEF DESCRIPTION OF DRAWINGS

FIGS. 4A to 4C are diagrams illustrating other examples of the structure of the air filter unit of the present embodiment.

DETAILED DESCRIPTION OF EMBODIMENT(S)

Figure 1:
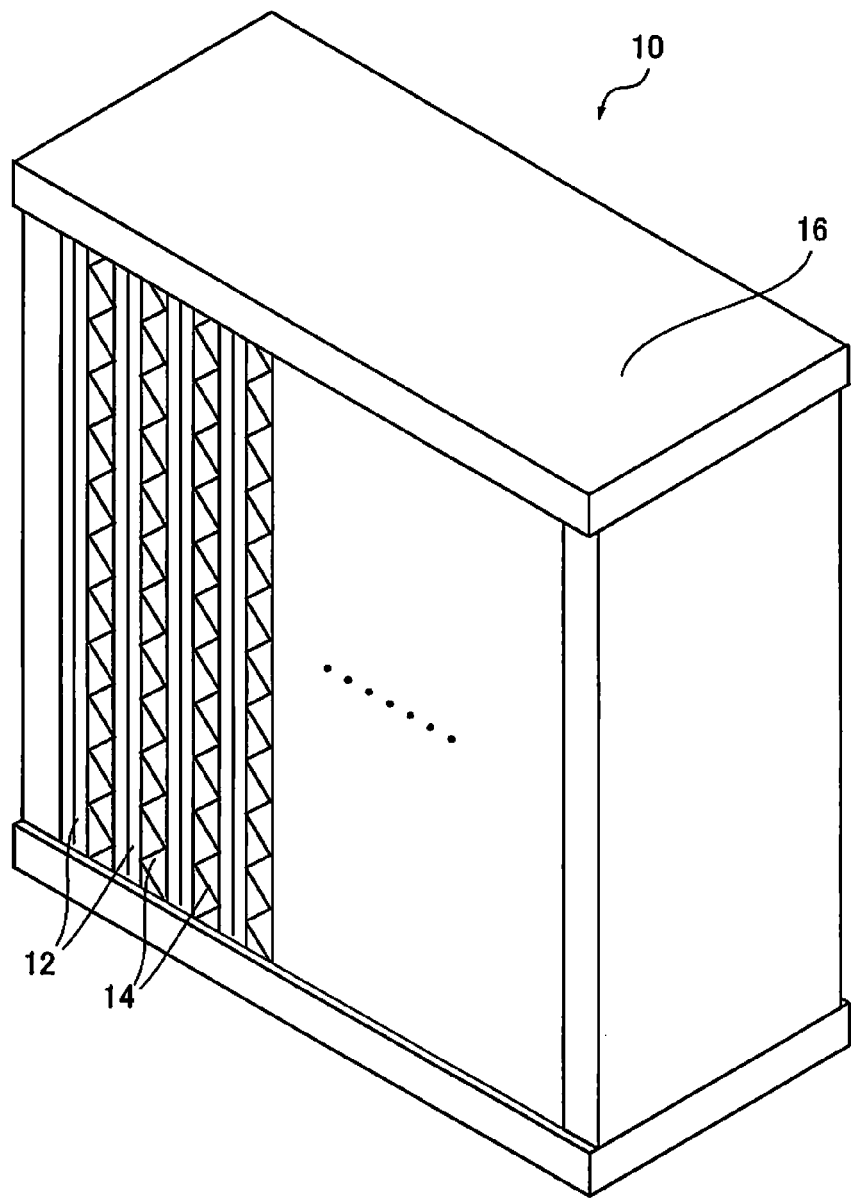
FIG. 1 is a perspective view of an appearance of an air filter unit of the present embodiment.
Figure 2A:
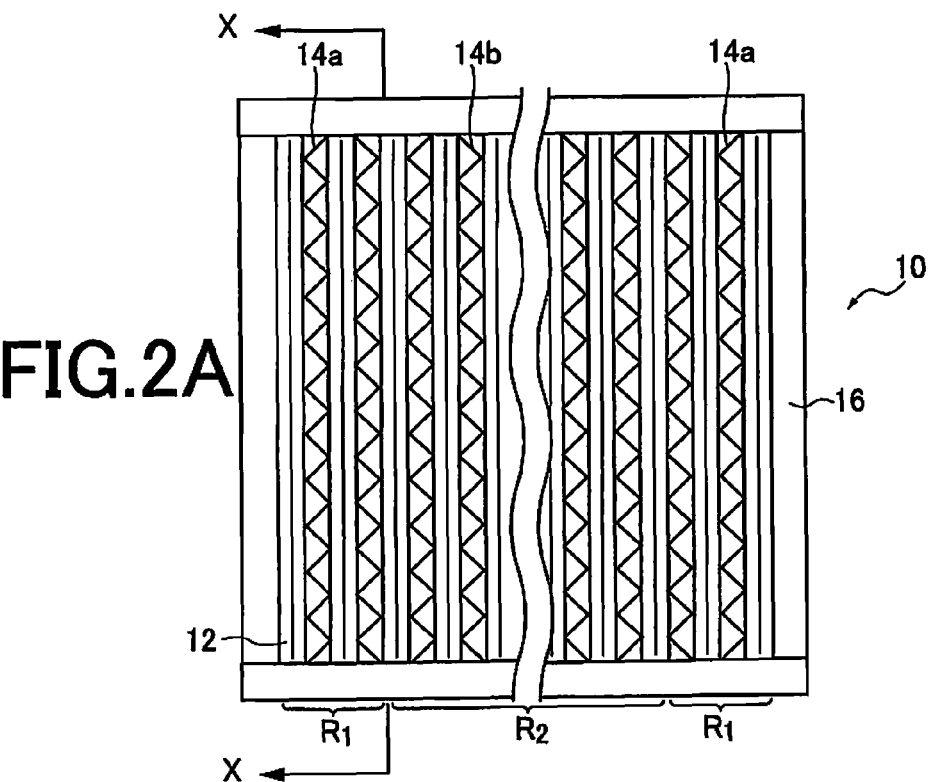
FIG. 2A is a front view of the air filter unit of the present embodiment.
Figure 2B:
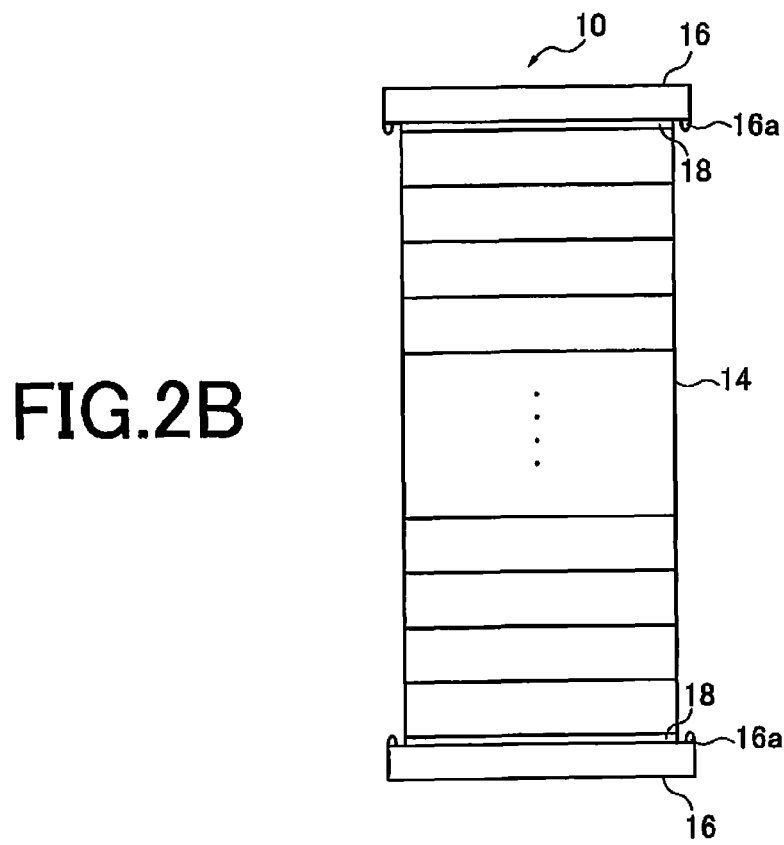
FIG. 2B is a cross sectional view as viewed from the arrows along the X-X line illustrated in FIG. 2A.

Hereinafter, an air filter unit of the present invention will be described in detail.
[Air Filter Unit]
FIG. 1 is a perspective view of an appearance of an air filter unit of the present embodiment. FIGS. 2A and 2B are a front view and an X-X cross sectional view of an air filter unit 10 of the present embodiment.

The air filter unit 10 illustrated in FIG. 1 is an air filter unit for high temperature, and has heat resistance at the temperature of 350° C. or more (for example, up to 400° C.).

The air filter unit 10 mainly includes a pleated filter medium 12, separators 14 that are space-supporting members, a filter frame body 16, and a fiber sealing material 18 (see FIG. 2B).

The pleated filter medium 12 has a zigzag shape in which a fibrous filter medium is folded along a first direction (an up and down direction of FIG. 1) multiple times. The pleated filter medium 12 includes an inorganic fibrous filter paper. As the inorganic fibrous filter paper, a filter medium for HEPA or ULPA, which is a glass fiber paper made by a sheet making method in which ultra-thin glass fibers are bonded with organic binder, can be used, for example. The pleated filter medium 12 is formed such that mountain fold and valley fold are performed 90 times with respect to a sheet filter medium, for example, so that the sheet filter medium faces an upper stream side and a downstream side of an air flow.

The separators 14 are space-supporting members for respectively maintaining a plurality of spaces formed by folding the fibrous filter paper in the pleated filter medium 12, and are a plurality of metal members respectively inserted into the spaces. The separators 14 abut on the fiber sealing material 18. To be specific, the separator 14 is formed by being bent in a wave-shaped manner, and is inserted into the space and extended in the up and down direction in the drawing, as illustrated in FIG. 1. The material of the separator 14 includes austenite-based or ferrite-based stainless steel, 1000 series pure aluminum (aluminum in No. 1000s), a 2000 series Al—Cu-based alloy, a 3000 series Al—Mn-based alloy, a 4000 series Al—Si-based alloy, a 5000 series Al—Mg-based alloy, a 6000 series Al—Mg—Si-based alloy, a 7000 series Al—Zn—Mg-based alloy, a 8000 series aluminum alloy including 8011H18, and the like. The aluminum alloy 8011H18 has a composition of Al: 97.52 mass % or more, Cu: 0.1 mass %, Si: 0.5 to 0.9 mass %, Fe: 0.6 to 1.0 mass %, Mn: 0.2 mass %, Zn: 0.1 mass %, and Ti: 0.08 mass %, for example. Especially, it is preferable to use aluminum or an aluminum alloy in terms of a decrease in the weight of the separators 14. Since separators 14 are respectively inserted into a large number of the folded spaces, if stainless steel is used, the weight is increased and installation workability of the air filter unit 10 is deteriorated, and an installation place of the air filter unit 10 is limited. Therefore, stainless steel is not preferable. The plate thickness of the separators 14 is 25 to 65 μm, for example.

The filter frame body 16 is a metal member that surrounds a periphery of the pleated filter medium 12 in which the separators 14 are respectively inserted into the spaces, and supports and fixes the pleated filter medium 12. The filter frame body 16 is configured such that four frame plates in which ribs 16a rise are combined, the ribs 16a rising at the upper stream side and the downstream side (both sides of a right and left direction of FIG. 2B) where the air flow flows. Tip portions of the ribs 16a are bent toward inner sides of the air filter unit 10. The filter frame body 16 is preferably configured from stainless steel, for example SUS304 or SUS430 in terms of thermal durability. Alternatively, as the filter frame body 16, aluminum, an aluminum alloy, or steel can be used.

The fiber sealing material 18 abuts on both end portions of a first direction (both end portions of the up and down direction of FIG. 1) in the pleated filter medium 12 provided in the filter frame body 16, thereby to seal gaps between the pleated filter medium 12 and the filter frame body 16.

As the fiber sealing material 18, an ultra-thin glass fiber is used. As the fiber sealing material 18, one configured from an inorganic fiber having the thickness of 1 to 4 mm, a weight per area of 80 to 120 g/m$^2$, and the density of 20 to 120 kg/m$^3$ can be used, for example. The ultra-thin glass fiber is an ultra-thin glass fiber having an average fiber diameter of 1 μm or less, for example. The fiber sealing material 18 is preferably formed such that the above-described fiber is subjected to fiber-spinning/fiber-gathering and is configured into a sheet shape without using binder. If the density of the fiber sealing material 18 made of the ultra-thin glass fiber exceeds 120 kg/m$^3$, absorbability of extension of the metal used for the filter frame body 16 and the separators 14 becomes worse. Meanwhile, if the density of the fiber sealing material 18 is less than 20 kg/m$^3$, force to press a filter pack (an assembly in which the separators 14 are inserted into the spaces of the pleated filter medium 12) is small, and leakage of dust and the like is caused and sealability cannot be maintained. Further, if the average fiber diameter exceeds 1 μm, the fiber sealing material 18 is less likely to fit to unevenness of the zigzag-shaped end portions of the pleated filter medium 12, and the sealability becomes insufficient.

In such an air filter unit 10, all of linear expansion coefficients of the separators 14 are equal to or more than a linear expansion coefficient of the filter frame body 16. During use of the air filter unit 10, when the temperature of the air filter unit 10 is changed from a room temperature to a high temperature of 300° C. or more and even if thermal expansion is caused in the separators 14 and the filter frame body 16, the thermal expansion of the filter frame body 16 is equal to or smaller than the thermal expansion of the separators 14 due to the difference of the linear expansion coefficients between the separators 14 and the filter frame body 16. Therefore, not only in the room temperature, but also in the high temperature, the state in which the separators 14 abut on the fiber sealing material 18 is maintained, and the separators can hold the shape of the pleated filter medium 12. Meanwhile, when the linear expansion coefficients of the separators 14 are smaller than the linear expansion coefficient of the filter frame body 16, if the thermal expansion is caused in the separators 14 and the filter frame body 16, a gap is caused between the separators 14 and the fiber sealing material 18 due to the difference of the thermal expansion, and the separators 14 do not abut on the fiber sealing material 18. As a result, a case in which the separators 14 cannot partially hold the shape of the pleated filter medium 12 may be caused at a high-temperature state. Therefore, the linear expansion coefficients of the separators 14 are equal to or more than the linear expansion coefficient of the filter frame body 16. Here, the linear expansion coefficient is a mean linear expansion coefficient calculated from lengths at 0° C. and at 400° C.

Further, the separators 14 are divided into two separators according to the magnitude of the linear expansion coefficient. Separators 14a having a smaller linear expansion coefficient are provided in side portion regions $R_1$ including both side portions positioned at outermost sides of the pleated filter medium 12 in a second direction (the right and left direction in FIG. 1) perpendicular to the first direction (the up and down direction of FIG. 1). A separator 14b having a larger linear expansion coefficient than the separators 14a is provided at a central portion region $R_2$ sandwiched between the side portion regions $R_1$.

Ends of ranges of the side portion regions $R_1$ exist in ranges of the spaces of 0.05*N to 0.1*N (a maximum integer not exceeding 0.05*N and 0.1 N if 0.05*N and 0.1*N are not integers) counted in order from the both end portions of the pleated filter medium 12 in the second direction (the right and left direction in FIG. 1), where a total number of the spaces formed by folding the fibrous filter medium in the pleated filter medium 12 is N. For example, when the total number of the spaces of the pleated filter medium 12 is 90, the ends of the side portion regions $R_1$ at central portion sides are positioned in the ranges of the fourth to ninth spaces counted in order from the both side portions of the pleated filter medium 12. Therefore, in this case, the separators 14a having a larger linear expansion coefficient are provided in the four to nine folded spaces from the both side portions in succession.

The separators 14a positioned in the above-described ranges are close to the filter frame body 16, and are subject to the thermal history of the room temperature to the high temperature in a substantial manner, and thus contraction of the separators 14 is larger than the separators 14b in the other region. Therefore, the linear expansion coefficients of the separators 14a are smaller than the linear expansion coefficients of the separators 14b, so as to get closer to the linear expansion coefficient of the filter frame body 16.

The reason of the thermal contraction of the separators 14 by the air filter unit 10 being subject to the thermal history in which the room temperature and the high temperature of 300 to 400° C. are repeated can be considered as follows.

Figure 7:
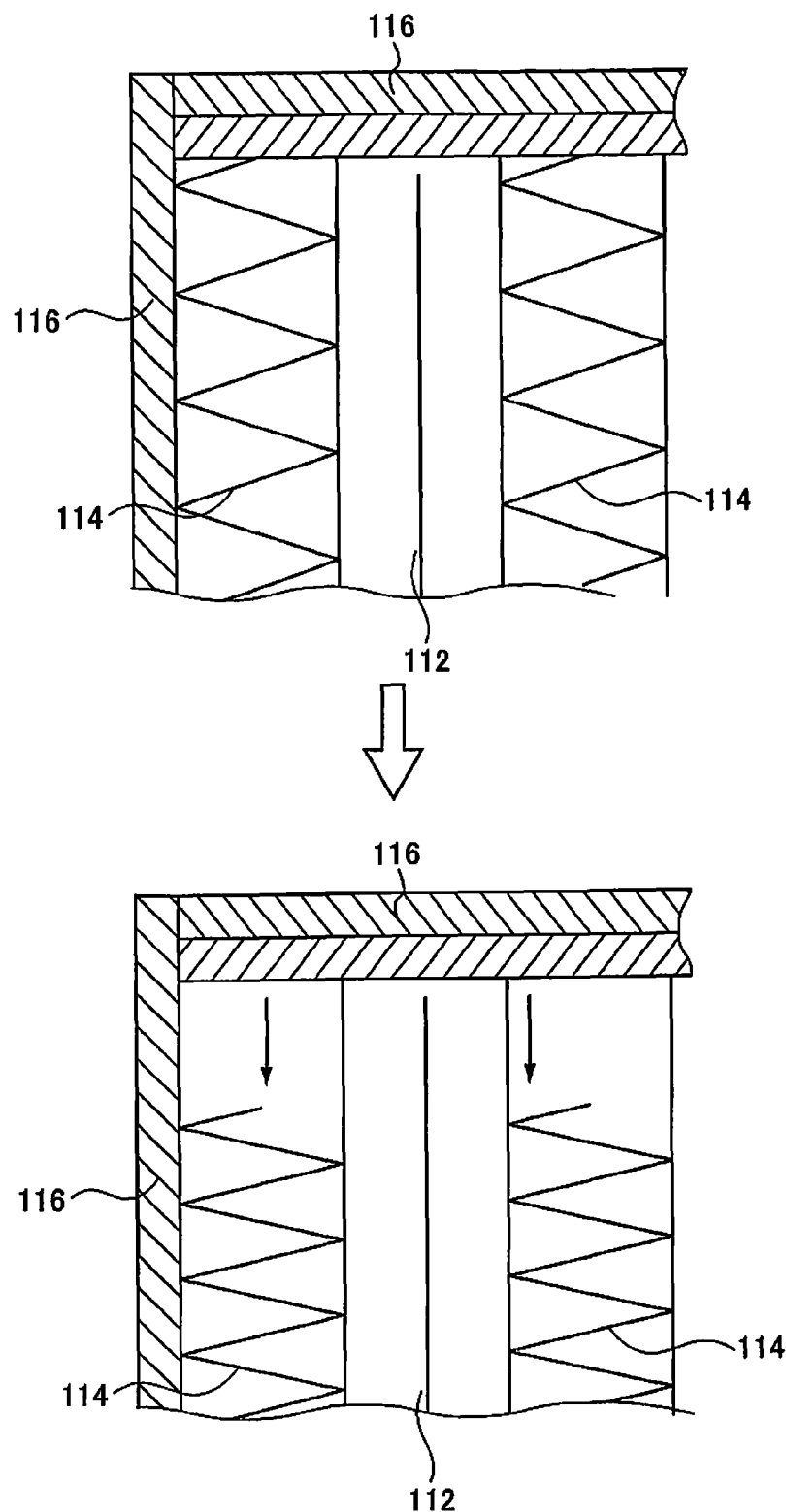
FIG. 7 is a diagram illustrating a conventional air filter unit.

That is, when the temperature rises to the high temperature of 300 to 400° C., the separators 14 are about to perform thermal expansion. However, the thermal expansion of the filter frame body 16 is equal to or smaller than the thermal expansion of the separators 14. Moreover, the separators 14 are inserted into the spaces to hold the shape of the pleated filter medium 12, and thus there is no room for the separators 14 to expand. Especially, the separators 14 are long in the up and down direction in FIG. 1, and thus are about to expand in the up and down direction in FIG. 1 in a large manner. However, the state in which the expansion is suppressed by the filter frame body 16 and the fiber sealing material 18 is continued. Especially, expansion of the separators 14 in the side portion regions $R_1$ close to the filter frame body 16 is restricted in a larger manner than the separators 14 in the central portion region $R_2$. With the continuance of the state, the separators 14 are suppressed by the filter frame body 16 and the shapes are stabilized. Following that, when the use of the air filter unit 10 ends and the temperature is decreased to the room temperature, the separators 14 thermally contract. The separators 14, expansion of which has been suppressed and the shapes of which have been stabilized by the filter frame body 16 at the high temperature, thermally contracts from the state. Therefore, end portions of the separators 14 in the up and down direction do not abut on the fiber sealing material 18. The separators 14 are repeatedly subject to such a thermal history, thereby to contract to an extent that a gap is finally caused, as illustrated in FIG. 7. For example, a conventional separators 14 contract by about 5 to 10 mm.

Therefore, in the present embodiment, the separators 14a provided in the side portion regions $R_1$ in which the separators 14 are especially subject to the thermal history in a large manner have smaller linear expansion coefficients than the separators 14b provided in the central portion region $R_2$ so that the linear expansion coefficients of the separators 14a get closer to the linear expansion coefficient of the filter frame body 16. A ratio of the linear expansion coefficients of the separators 14a to the filter frame body 16 is preferably 1.0 to 3.0.

Further, a ratio A/B is preferably not less than 0.4 and less than 1.0, where the linear expansion coefficients of the separators 14a are A, and the linear expansion coefficient of the separator 14b is B.

As such separators 14a, ones obtained such that a metal material that is the same as the metal material of the separator 14b is subjected to thermal treatment at the temperature of 350° C. to 400° C. for 0.5 to 2.0 hours are preferably used. An upper limit of the temperature used for the thermal treatment is 400° C., for example. The ones subjected to the thermal treatment as described above in advance can be preferably used for the separators 14a because the linear expansion coefficients are small. Especially, when aluminum or an aluminum alloy is used as the separators 14a and the separators 14b, the linear expansion coefficients of the separators 14a can be efficiently made smaller than the linear expansion coefficients of the separators 14b, and the radio A/B can be easily made from 0.4 to 1.0 (exclusive of 1.0), by application of the thermal treatment.

Figure 3:
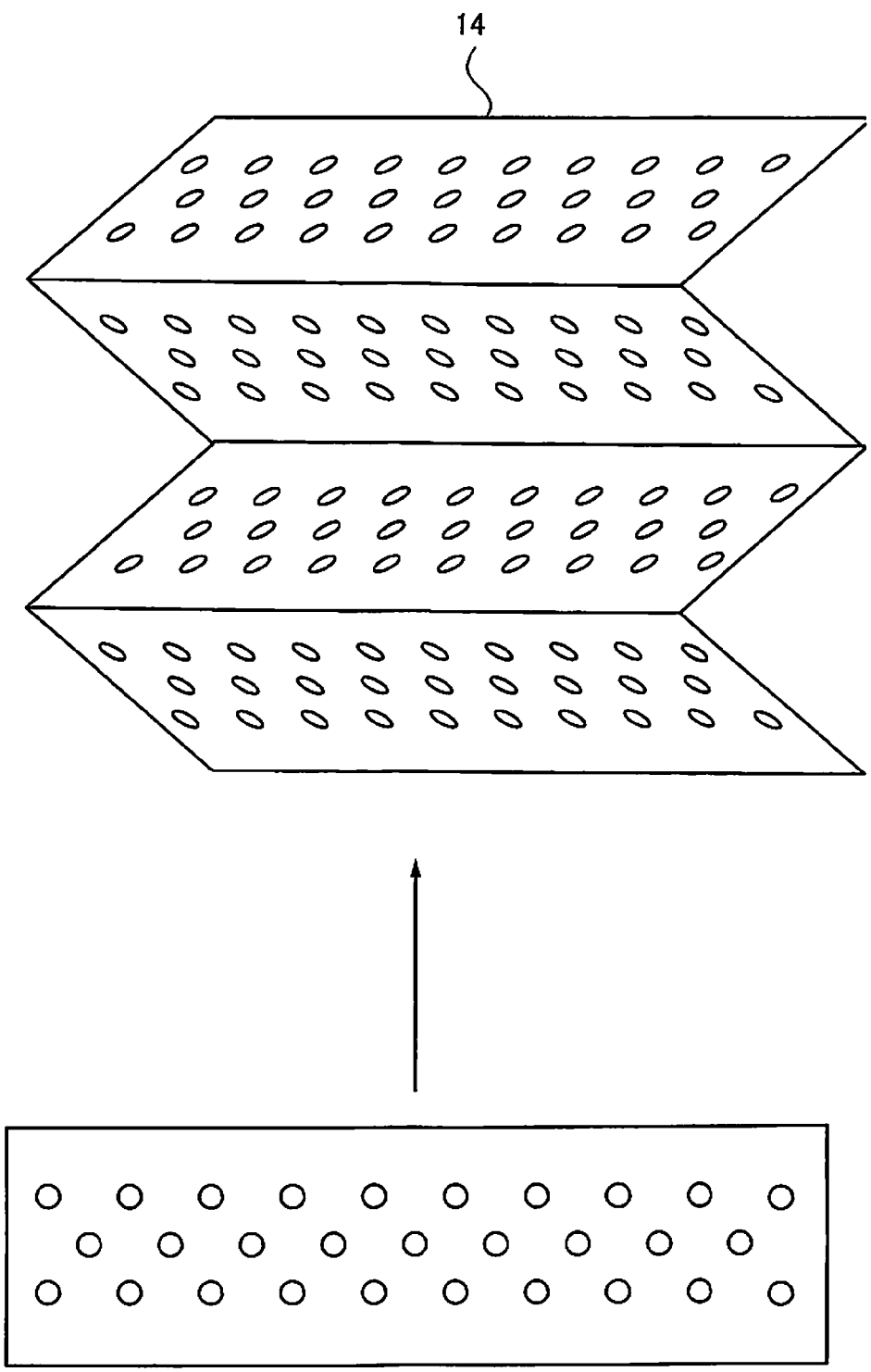
FIG. 3 is a diagram illustrating an example of a structure of the air filter unit of the present embodiment.

Further, it is preferable to provide a plurality of embossed uneven portions on surfaces of the separators 14a, as illustrated in FIG. 3. That is, deformed portions that can absorb the thermal expansion and contraction when the separators 14a thermally expand or thermally contract in accordance with the thermal history, and can realize expansion and contraction similar to the filter frame body 16 are provided in the separators 14a. Such deformed portions are preferably processed in advance such that the uneven portions can be made before a foil member that is a base of the separator 14a is processed in the wave-shaped manner.

Further, the embossed uneven portions include forms illustrated in FIGS. 4A to 4C. As illustrated in FIG. 4A, recessed portions and protruding portions linearly extending parallel to the mountain fold and valley fold lines of the separator 14, and recessed portions and protruding portions linearly extending perpendicular to the mountain fold and valley fold lines can be provided as the embossed uneven portions. As illustrated in FIG. 4B, recessed portions and protruding portions parallel to the mountain fold and valley fold lines of the separator 14 can be provided as the embossed uneven portion. Further, as illustrated in FIG. 4C, recessed portions and protruding portions obliquely extending to the mountain fold and valley fold lines of the separator 14 (the solid line in the drawing) can be provided as the embossed uneven portions.

Figure 5:
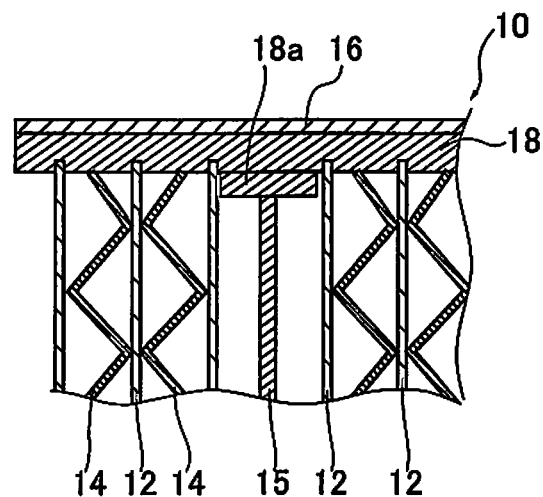
FIG. 5 is a diagram illustrating another example of the structure of the air filter unit of the present embodiment.
Figure 6:
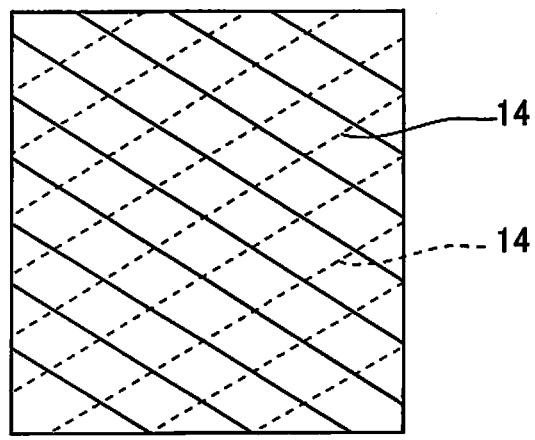
FIG. 6 is a diagram illustrating another example of the structure of an air filter unit of the present embodiment.

Further, in the present embodiment, it is preferable to interpose a rigid plate 15 in place of at least one separator 14b positioned in the central portion region $R_2$ of the filter pack to cause end portions of the up and down direction of the rigid plate 15 to abut on the filter frame body 16 through a sheet sealing material layer 18a of an ultra-fine glass fiber, in the air filter unit 10, as illustrated in FIG. 5, and to arrange the fold lines of the adjacent separators 14 and 14 to intersect with each other through the pleated filter medium 12, as illustrated in FIG. 6, in terms of maintenance of the shape of the filter pack.

As described above, the liner expansion coefficients of the separators 14 of the air filter unit 10 are equal to or more than the linear expansion coefficient of the filter frame body 16, and all of the linear expansion coefficients of the separators 14a provided in the side portion regions $R_1$, of the separators 14, are set smaller than the linear expansion coefficients of the separators 14b provided in the central portion region $R_2$. Therefore, the thermal expansion of the separators 14a provided in the side portion regions $R_1$ is closer to the thermal expansion of the filter frame body 16 than to that of the separators 14b. Therefore, the separators 14 are less likely to contract by being subject to the multiple times of the thermal history, like the conventional separators 114 illustrated in FIG. 7.

Especially, the ratio A/B is set not less than 0.4 and less than 1.0, where the linear expansion coefficients of the separators 14a provided in the side portion regions $R_1$ are A and the linear expansion coefficients of the separators 14b provided in the central portion region $R_2$ are B, whereby the contraction of the separators can be more effectively reduced.

Examples and Comparative Examples

Hereinafter, air filter units were produced using various types of separators in order to confirm the effect of the present embodiment.

In Working Examples 1, 2, and 3, and Comparative Examples 1 and 2, as a pleated filter medium 12, a filter medium having a weight per area of 100 g/m², using an ultra-thin glass fiber made of a C glass fiber, was used, and the mountain fold and the valley fold were performed 90 times with respect to the filter medium, and separators were respectively inserted into spaces formed by folding the medium, so that a filter pack having a size of 610 mm×610 mm×290 mm (longitudinal length×lateral length×width length) was produced. As a filter frame body, SUS430 having the thickness of 2 mm was used. A linear expansion coefficient of SUS430 was $11.2 \times 10^{-6}$ °C.$^{-1}$ (an average of 0 to 400° C.).

As a fiber sealing material 18, a sheet material having the thickness of 2 mm, a weight per area of 112 g/m², the density of 54 kg/m³, and an average fiber diameter of E glass fiber of 0.6 μm (1700 rails) was used, and 40 g of the sheet material was used for one air filter unit.

In the air filter unit, the configurations illustrated in FIGS. 5 and 6 were used. As a rigid plate 15, SUS304 having the thickness of 1.2 mm was used. An intersection angle of the separators illustrated in FIG. 6 was 3 degrees. As a sheet sealing material 18a, a sealing material that is the same as the fiber sealing material 18 was used.

Meanwhile, in Working Example 1, as for separators, a foil of an aluminum alloy 3304 having the thickness of 60 μm was bent in a wave manner, and used. As separators 14a provided in side portion regions $R_1$ (at five spaces in right and left side portion regions $R_1$, a total of 10 spaces), ones subjected to thermal treatment at 350° C. for one hour in advance were used. As separators 14b provided in a central portion region $R_2$ (at 80 places), ones not subjected to the thermal treatment were used. Linear expansion coefficients of the separators 14a were $28.29 \times 10^{-6}$ °C.$^{-1}$ (an average of 0 to 400° C.), and linear expansion coefficients of the separators 14b were $29.18 \times 10^{-6}$ °C.$^{-1}$ (an average of 0 to 400°).

In Working Example 2, a foil of an aluminum alloy 8011H18 having the thickness of 60 μm was bent in a wave manner and used. As separators 14a provided in side portion regions $R_1$, ones subjected to thermal treatment at 350° C. for one hour in advance were used. As separators 14b provided in a central portion region $R_2$, ones not subjected to the thermal treatment were used. Linear expansion coefficients of the separators 14a were $28.16 \times 10^{\circ}$ C.$^{-1}$ (an average 0 to 400° C.), and linear expansion coefficients of the separators 14b were $28.61 \times 10^{-6}$ °C.$^{-1}$ (an average of 0 to 400° C.).

In Working Example 3, foils of SUS304 having the thickness of 30 μm and of an aluminum alloy 8011H18 having the thickness of 60 μm were bent in a wave manner and used. As separators 14a provided in side portion regions $R_1$, SUS304 not subjected to thermal treatment was used. As separators 14b provided in a central portion region $R_2$, an aluminum alloy 8011H18 not subjected to the thermal treatment was used. Linear expansion coefficients of the separators 14a were $17.9 \times 10^{-6}$ °C.$^{-1}$ (an average of 0 to 400° C.), and linear expansion coefficients of the separators 14b were $28.61 \times 10^{-6}$ °C.$^{-1}$ (an average of 0 to 400° C.).

Meanwhile, in Comparative Example 1, a foil of an aluminum alloy 3304 having the thickness of 60 μm was bent in a wave manner, and used. In Comparative Example 1, ones not subjected to thermal treatment were used for all separators.

Therefore, linear expansion coefficients of the all separators were 29.18×10° C.$^{-1}$ (an average of 0 to 400°), which is similar to the linear expansion coefficients of the separators 14b of Working Example 1.

In Comparative Example 2, a foil of an aluminum alloy 8011H18 having the thickness of 60 μm was bent and used. In Comparative Example 2, ones not subjected to thermal treatment were used for all separators. Therefore, linear expansion coefficients of the all separators were 28.61×10° C.$^{-1}$ (an average of 0 to 400° C.), which is similar to the linear expansion coefficients of the separators 14b of Working Example 2.

Collection efficiency and contraction of the separators of the air filter units were investigated using the produced air filter units. For the contraction of the separators, a thermal history was provided to the air filter units such that one cycle of a process of raising the temperature of the air filter units from 30° C. to 350° C. by taking 1.5 hours, maintaining 350° C. for one hour, and decreasing the temperature to 30° C. by taking four hours was repeated by 20 cycles. As the contraction of the separators, maximum contracting lengths of the contraction of a plurality of separators were measured immediately after the 0$^{th}$ cycle (immediately after the start of the measurement), 5$^{th}$ cycle, 10$^{th}$ cycle, and 15$^{th}$ cycle.

Meanwhile, as for the collection efficiency of the air filter units, the air filter units were set to a rectangular duct, a flow of the air was adjusted such that a flow rate becomes 35 m$^3$/minute, atmosphere dust particles were introduced to the upper stream side of the air filter units, and the concentrations of 0.3 μm particles at the upper stream side and the downstream side of the air filter units were measured using a light scattering type particle counter. At that time, the cycles of the thermal history were provided, and the measurement was performed. The collection efficiency of the air filter units was measured in a state of the room temperature immediately after the end of the 0$^{th}$ cycle (immediately after the start of the measurement), 5$^{th}$ cycle, 10$^{th}$ cycle, and 15$^{th}$ cycle, and the collection efficiency of the air filter units was obtained according to the formula below:

Collection efficiency (%)=[1−(the concentration of the particles at the downstream side/the concentration of the particles at the upper stream side)]×100

The table 1 below indicates measurement results of the collection efficiency of the air filters and the contraction lengths of the separators.

According to the table 1, in Working Examples 1, 2, and 3, in which the linear expansion coefficients are differentiated between the side portion regions $R_1$ and the central portion region $R_2$, the collection efficiency was 99.97% or more in all of the 15$^{th}$ cycles, and the air filters were accepted products. Meanwhile, the contraction lengths were 4 mm or less, which fall within an allowable range.

In Comparative Examples 1 and 2, the contraction lengths exceeded 4 mm, which is an upper limit of the allowable range, and the air filters were not accepted products. Especially, in Comparative Example 2, the collection efficiency fell below 99.97%, which is a lower limit of the allowable range, in the 10$^{th}$ cycle and the 15$^{th}$ cycle. This is assumed that the collection efficiency was decreased because the contraction length became large, and maintenance of the shape of the pleated filter medium became difficult, and the shape was deformed.

As described above, the effect of the air filter unit of the present embodiment is apparent.

TABLE 1

| | Separators | | Collection efficiency (%) | | | | Contraction length (mm) | | | |
|---|---|---|---|---|---|---|---|---|---|---|
| | Aluminum alloy (including SUS) | Existence or nonexistence of thermal treatment | 0$^{th}$ cycle | 5$^{th}$ cycle | 10$^{th}$ cycle | 15$^{th}$ cycle | 0$^{th}$ cycle | 5$^{th}$ cycle | 10$^{th}$ cycle | 15$^{th}$ cycle |
| Working Example 1 | 3304 | Side portion regions $R_1$: Thermal treatment | 99.998 | 99.987 | 99.985 | 99.974 | 0 | 1 | 2 | 4 |
| Working Example 2 | 8011H18 | Side portion regions $R_1$: Thermal treatment | 99.997 | 99.985 | 99.98 | 99.972 | 0 | 1 | 2 | 4 |
| Working Example 3 | SUS304/8011H18 | No thermal treatment is applied | 99.993 | 99.993 | 99.991 | 99.991 | 0 | 1 | 2 | 4 |
| Comparative Example 1 | 3304 | No thermal treatment is applied | 99.996 | 99.996 | 99.971 | 99.971 | 0 | 7 | 9 | 11 |
| Comparative Example 2 | 8011H18 | No thermal treatment is applied | 99.996 | 99.985 | 99.962 | 99.967 | 0 | 2 | 5 | 9 |

As described above, the air filter unit of the present invention has been described in details. However, the present invention is not limited to the above embodiments, and various modifications and changes can be made without departing from the gist of the present invention.

The invention claimed is:

1. An air filter unit that collects dust in an air flow comprising:
    a zigzag-shaped pleated filter medium including a fibrous filter medium folded along a first direction multiple times;
    a plurality of metal space-supporting members bent in a wave-shaped manner, extending in the first direction, and inserted into spaces formed in the pleated filter medium by the folding of the fibrous filter medium in order to maintain each of the spaces;
    a metal filter frame body surrounding a periphery of the pleated filter medium in which the space-supporting members are inserted into the spaces, and the metal filter frame body supporting and fixing the pleated filter medium; and
    a fiber sealing material sealing a gap between the pleated filter medium and the filter frame body, by abutting on both end portions of the first direction in the pleated filter medium,
    linear expansion coefficients of the space-supporting members being equal to or more than a linear expansion coefficient of the filter frame body,
    the linear expansion coefficients of first space-supporting members of the plurality of space supporting members being smaller than the linear expansion coefficient of a second space-supporting member of the plurality of space supporting members, the first space-supporting members being provided in side portion regions including both side portions positioned at outermost sides of the pleated filter medium in a second direction perpendicular to the first direction, and the second space-supporting member being provided in a central portion region sandwiched between the side portion regions.

2. The air filter unit according to claim 1, wherein a metal material identical to a metal material of the second space-supporting member, and to which thermal treatment is applied at a temperature of 350 to 400° C. for 0.5 to 2 hours, is used as the first space-supporting members.

3. The air filter unit according to claim 1, wherein stainless steel is used as the filter frame body, and aluminum or an aluminum alloy is used as the first space-supporting members and the second space-supporting member.

4. The air filter unit according to claim 1, wherein a ratio A/B is not less than 0.4 and is less than 1.0, where
the linear expansion coefficient of the first space-supporting members is A, and
the linear expansion coefficient of the second space-supporting member is B.

5. The air filter unit according to claim 1, wherein a plurality of embossed uneven portions is provided on a surface of the first space-supporting members.

6. The air filter unit according to claim 2, wherein stainless steel is used as the filter frame body, and aluminum or an aluminum alloy is used as the first space-supporting members and the second space-supporting member.

7. The air filter unit according to claim 2, wherein a ratio A/B is not less than 0.4 and is less than 1.0, where
the linear expansion coefficient of the first space-supporting members is A, and
the linear expansion coefficient of the second space-supporting member is B.

8. The air filter unit according to claim 2, wherein a plurality of embossed uneven portions is provided on a surface of the first space-supporting members.

9. The air filter unit according to claim 3, wherein a ratio A/B is not less than 0.4 and is less than 1.0, where
the linear expansion coefficient of the first space-supporting members is A, and
the linear expansion coefficient of the second space-supporting member is B.

10. The air filter unit according to claim 3, wherein a plurality of embossed uneven portions is provided on a surface of the first space-supporting members.

11. The air filter unit according to claim 4, wherein a plurality of embossed uneven portions is provided on a surface of the first space-supporting members.

* * * * *